(12) United States Patent
Custer

(10) Patent No.: US 6,604,316 B1
(45) Date of Patent: Aug. 12, 2003

(54) OFFSET ATTACHMENT FOR USE WITH A FIREARM SCOPE

(76) Inventor: Bryan A. Custer, Farm Rd., P.O. Box 382, Monteagle, TN (US) 37356

(*) Notice: Subject to any disclaimer, the term of this patent is extended or adjusted under 35 U.S.C. 154(b) by 0 days.

(21) Appl. No.: 10/244,174

(22) Filed: Sep. 16, 2002

(51) Int. Cl.[7] .................................. F41G 1/40
(52) U.S. Cl. ..................................... 42/118
(58) Field of Search ........................ 359/402, 403, 359/405, 419, 425, 433, 430, 830, 852; 42/148, 118

(56) References Cited

U.S. PATENT DOCUMENTS

| | | | | |
|---|---|---|---|---|
| 815,657 A | * | 3/1906 | Swasey | 359/401 |
| 978,368 A | * | 12/1910 | Grubb | 359/405 |
| 1,209,958 A | * | 12/1916 | Graul | 359/401 |
| 1,250,393 A | * | 12/1917 | Vanderlip | 359/402 |
| 3,645,635 A | * | 2/1972 | Steck | 356/252 |
| 3,672,607 A | * | 6/1972 | Stauff et al. | 244/3.16 |
| 4,084,326 A | * | 4/1978 | Numbers | 42/122 |
| 4,264,123 A | | 4/1981 | Mabie | 350/57 |
| 4,275,639 A | * | 6/1981 | Garber | 89/41.19 |
| 4,299,044 A | | 11/1981 | Johannsen | 42/1 |
| 4,341,022 A | | 7/1982 | Santoro | 33/245 |
| 4,408,842 A | | 10/1983 | Gibson | 350/560 |
| 4,580,886 A | * | 4/1986 | Hajnal | 396/432 |
| 4,841,659 A | | 6/1989 | Williams | 42/101 |
| 4,887,893 A | * | 12/1989 | Dahlgren | 359/857 |
| 5,299,067 A | | 3/1994 | Kutz et al. | 359/827 |
| 5,410,398 A | * | 4/1995 | Appert et al. | 356/141.3 |
| 5,469,236 A | * | 11/1995 | Roessel | 396/432 |
| 6,154,313 A | * | 11/2000 | Isbell et al. | 359/419 |

FOREIGN PATENT DOCUMENTS

| | | | | |
|---|---|---|---|---|
| ES | 2041590 | * | 11/1993 | G01B/9/10 |
| GB | 2077936 A | * | 12/1981 | G02B/27/32 |

* cited by examiner

*Primary Examiner*—Michael J. Carone
*Assistant Examiner*—Denise J Buckley
(74) *Attorney, Agent, or Firm*—Donald R. Schoonover

(57) ABSTRACT

An accessory is used in connection with a sighting scope for a firearm and offsets the light exiting the sighting scope from one location to another. The accessory is used so a sighting scope located on a firearm held on one side of a shooter's body can be viewed from the shooter's eye located on the other side of the shooter's body.

1 Claim, 1 Drawing Sheet

OFFSET ATTACHMENT FOR USE WITH A FIREARM SCOPE

BACKGROUND OF THE INVENTION

1. Field of the Invention

The present invention relates to the general art of firearms, and to the particular field of accessories for firearms.

2. Discussion of the Related Art

Target shooting as well as hunting is an extremely popular sport for both men and women. Shooting contests are held nearly every weekend in many areas of the country. It is well known that hunting is one of the most popular sports in the United States. Accordingly, the firearm art includes a multitude of accessories intended to make shooting more accurate and efficient.

A sighting scope is one of the more popular accessories in the area of firearms. A sighting scope makes aiming a firearm, especially at a distant target, more accurate and efficient. Therefore, the art contains many examples of sighting scopes for use with firearms.

However, the sighting scopes presently available require a shooter to use the eye on the side of his or her head that corresponds to the side of the shooter's body on which the firearm is supported. Thus, a right-handed shooter will use one eye to sight through a scope, and a left-handed shooter will use the other eye.

This works well . . . until the shooter is required to use the eye other than the one he or she is used to. This requirement may result from some physical impairment that reduces or eliminates the use of the eye that the shooter has used and is used to using. This can be caused by an accident or the like that makes a heretofore useful eye either useless or have diminished capability. In such an instance, the shooter may have to re-learn to shoot or give up shooting altogether. Thus, for example, if a right-handed shooter loses the use of the eye he or she has been using, or that eye becomes impaired, the shooter will either have to learn to shoot left-handed or give up the sport.

Some scopes have very high magnification capabilities; however, this will only work if the shooter's eye needs only increased magnification to work. It will not work if the shooter has lost use of his or her shooting eye.

It would be helpful if the shooter could simply change shooting eyes without re-learning shooting technique.

Therefore, there is a need for an accessory for a firearm that will permit a shooter to use an eye on one side of his or her body while holding the firearm on the other side of his or her body.

The same situation exists if the shooter has lost all or part of the use of one side of his or her body. For example, if a right-handed shooter, for some reason, loses full use of his or her arms or hands that are used in the right-handed shooting technique, the shooter will have to re-learn shooting technique to use the other eye if he or she has to shoot left-handed instead of right-handed. Again, it would be helpful if the shooter could simply use the eye he or she was used to using even if he or she must learn to hold the firearm on the opposite side of his or her body that he or she is used to.

Therefore, there is a need for an accessory for a firearm that will enable a shooter to use his or her dominant eye even if he or she has lost part or all of the use of one side of his or her body with respect to shooting a firearm.

Therefore, in general, there is a need for an accessory for a firearm that will permit a shooter to continue shooting without re-learning all of his or her shooting technique if he or she loses part or all of the function of one side of his or her body.

Specifically, there is a need for an accessory for a firearm sighting scope that will re-direct a sighting light ray from one eye of a shooter to the other eye of the shooter.

PRINCIPAL OBJECTS OF THE INVENTION

It is a main object of the present invention to provide an accessory for a firearm that will permit a shooter to use an eye on one side of his or her body while holding the firearm on the other side of his or her body.

It is another object of the present invention to provide an accessory for a firearm that will enable a shooter to use his or her dominant eye even if he or she has lost part or all of the use of one side of his or her body with respect to shooting a firearm.

It is another object of the present invention to provide an accessory for a firearm that will permit a shooter to continue shooting without re-learning all of his or her shooting technique if he or she loses part or all of the function of one side of his or her body.

It is a specific object of the present invention to provide an accessory for a firearm sighting scope that will re-direct a sighting light ray from one eye of a shooter to the other eye of the shooter.

SUMMARY OF THE INVENTION

These, and other, objects are achieved by an offset unit for use with a firearm sighting scope unit which comprises: a Z-shaped body having a main leg, a first leg and a second leg with the first leg oriented at a right angle to the main leg, the second leg oriented at a right angle to the main leg and parallel to the first leg; a scope eyepiece connection on a first end of the first leg of the Z-shaped body; an ocular lens on a second end of the second leg of the Z-shaped body; a first mirror located at an Intersection between the main leg and the first leg of the Z-shaped body and which is positioned to reflect light exiting an ocular lens in an eyepiece of a firearm sighting scope, the light reflected by the first mirror being oriented at a right angle to the light exiting the eyepiece of the firearm sighting scope; a second mirror located at an intersection between the main leg and the second leg of the Z-shaped body and which is positioned to reflect light reflected by the first mirror, the light reflected by the second mirror being oriented at a right angle to the light reflected by the first mirror and parallel to the light exiting the eyepiece of the firearm sighting scope, the light reflected by the second mirror being directed to the ocular lens. A light path is defined through the Z-shaped body which includes a first portion extending from the scope eyepiece connection through the first leg of the Z-shaped body to the first mirror in the direction of light exiting the ocular lens in the eyepiece of the firearm sighting scope, a second portion extending from the first mirror to the second mirror through the main leg of the Z-shaped body, the second portion of the light path being oriented at a right angle to the first portion of the light path, and a third portion extending from the second mirror through the second leg to the ocular lens, the third portion of the light path being oriented at a right angle to the second portion of the light path and parallel to the first portion of the light path.

The offset unit embodying the present invention thus permits a person to position a firearm on one side of his or her body while using the eye on the other side of his or her body to sight the firearm. Thus, a person who has lost part or all of the sight of one eye can use the other eye for shooting and does not have to re-learn shooting technique. The same applies for loss or partial loss of one side of the shooter's body. That person can still use a dominant eye without re-learning this portion of the shooting technique.

BRIEF DESCRIPTION OF THE DRAWING FIGURES

DETAILED DESCRIPTION OF THE INVENTION

Figure 1:
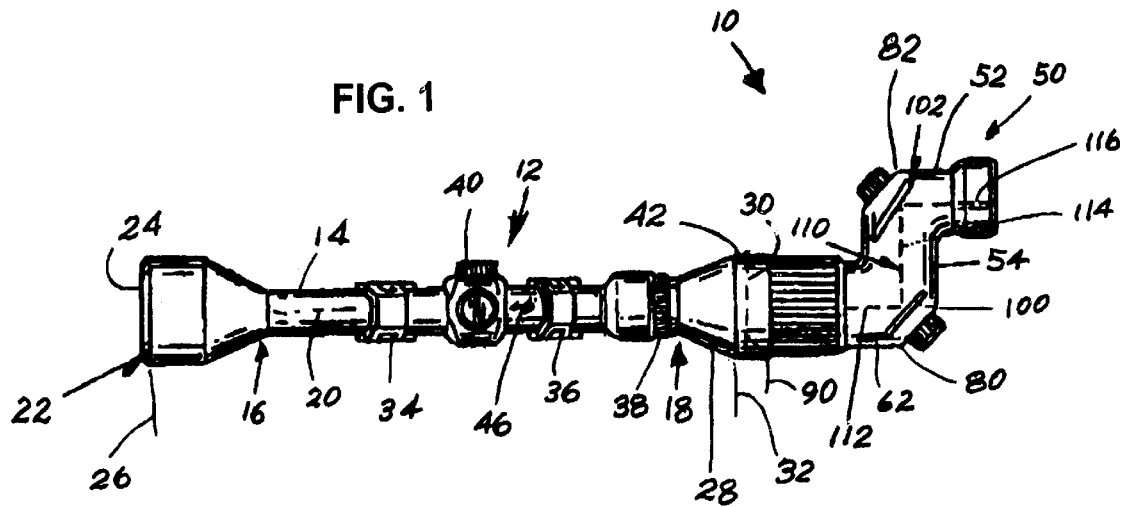
FIG. 1 is a plan view of an offset unit embodying the present invention.
Figure 2:
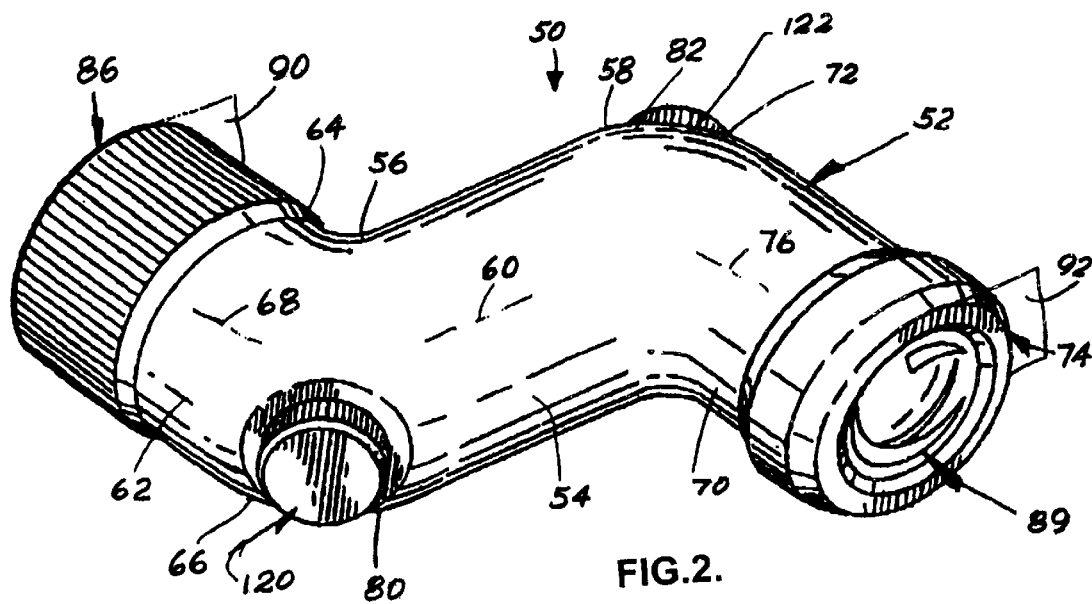
FIG. 2 is an enlarged, perspective view of the offset unit embodying the present invention.

Other objects, features and advantages of the invention will become apparent from a consideration of the following detailed description and the accompanying drawings.

Referring to the figures, it can be understood that the present invention is embodied in a combination 10 which includes a sighting scope 12 for a firearm. The sighting scope 12 comprises a tubular body 14 having an objective end 16, an eyepiece end 18 which is spaced apart from the objective end 16, and a longitudinal axis 20 which extends between the objective end 16 and the eyepiece end 18. An objective lens unit 22 is located on the objective end 16 of the tubular body 14 and includes an objective lens 24 and a plane 26 which contains the objective lens 24. An eyepiece lens unit 28 is located on the eyepiece end 18 of the tubular body 14 and includes an ocular lens 30 and a plane 32 containing the ocular lens 30 of the eyepiece lens unit 28. Plane 32 containing the ocular lens 30 is oriented parallel to plane 26 containing the objective lens 24. A first scope ring 34 is located on the tubular body 14 and a second scope ring 36 is also located on the tubular body 14 and is spaced apart from the first scope ring 34 in the direction of the longitudinal axis 20 of the body 14.

A focusing ring 38 is also located on the tubular body 14 and is associated with the ocular lens 30 of the eyepiece lens unit to control focusing of the ocular lens 30. A windage and elevation adjustment knob unit 40 is located on the tubular body 14 to adjust the scope for windage and elevation so the firearm associated with the scope will be accurate.

A tubular cover 42 on the eyepiece unit surrounds the ocular lens 30 and extends outwardly from the ocular lens 30 away from the objective end 16 of the tubular body 14. Cover 42 can include a coupling element, such as screw threads or the like.

A scope light path 46 is defined through the sighting scope and extends from the objective end 16 of the tubular body 14 to the eyepiece end 18 of the tubular body 14 in the direction of the longitudinal axis 20 of the tubular body 14.

Combination 10 includes an offset unit 50 for moving the light on light path 46 from one location adjacent to the ocular lens 30 to another location. This will permit the scope to be associated with a firearm held on one side of a shooter's body while the shooter uses an eye located on the other side of his or her body to sight through the scope. Offset unit 50 includes a Z-shaped body 52 having a main leg 54 having a first end 56 and a second end 58 and a longitudinal axis 60 extending between the first end 56 of the main leg 54 and the second end 58 of the main leg 54. Unit 50 further includes a first leg 62 having a first end 64 and a second end 66 having a longitudinal axis 68 which extends from first end 64 to second end 66. Second end 66 of the first leg 62 is connected to first end 56 of the main leg 54. A second leg 70 of the offset unit 50 has a first end 72 and a second end 74, with first end 72 of the second leg 70 connected to second end 58 of the main leg 54. A longitudinal axis 76 extends between the first end 72 of the second leg 70 and the second end 74 of the second leg 70.

Offset unit 50 further includes a first right angle corner 80 between second end 66 of first leg 62 and first end 56 of main leg 54 and a second right angle corner 82 between second end 58 of the main leg 54 and first end 72 of second leg 70.

An eyepiece connection 86 is located on first end 64 of the first leg 62. The eyepiece connection 86 has a connecting element 88, such as screw threads or the like, that mate with corresponding elements on the eyepiece lens unit of sighting scope 12 for releasably connecting first end 64 of the first leg 62 to tubular cover 42 on the eyepiece unit of the sighting scope.

An ocular lens 89 is located on second end 74 of the second leg 70 and serves a purpose common to such lenses on firearm sighting scopes. A plane 90 contains the eyepiece connection 86 of the Z-shaped body 52, and a plane 92 contains ocular lens 89 of the Z-shaped body 52 of the offset unit 50. Plane 92 is oriented parallel to plane 90 containing the eyepiece connection 86 of the Z-shaped body 52 and is spaced apart from the eyepiece connection 86 of the Z-shaped body 52.

A first mirror 100 is located at first corner 80 of the Z-shaped body 52 and is-oriented at a 45° with respect to plane 92 containing the ocular lens of the eyepiece lens unit of the sighting scope. Mirror 100 is positioned on longitudinal axis 68 of the first leg 62 and longitudinal axis 60 of the main leg 54 and is on scope light path 46. A second mirror 102 is located at second corner 82 of the Z-shaped body 52 and is oriented parallel to first mirror 100. Mirror 102 is positioned on longitudinal axis 60 of the main leg 54 of the Z-shaped body 52 and on longitudinal axis 76 of the second leg 70 of the Z-shaped body 52.

A light path 110 is defined through offset unit 50 and includes a first portion 112 extending from ocular lens 30 of the eyepiece lens unit of the sighting scope to first mirror 100 along scope light path 46. Light path 110 further includes a second portion 114 which is oriented at a right angle to first portion 112 and which extends from first mirror 100 to second mirror 102 in the direction of longitudinal axis 60 of the main leg 54 of the Z-shaped body 52. Light path 110 further includes a third portion 116 which is oriented at a right angle to second portion 114 of light path 110 through offset unit 50 and parallel to the first portion 112 of the light path 110 through the offset unit 50. Third portion 116 of the light path 110 extends from the second mirror 102 in the direction of longitudinal axis 76 of the second leg 70 of the Z-shaped body 52 from second mirror 102 to ocular lens 89 of the offset unit 50.

Offset unit 50 further includes a first mirror adjustment knob 120 mounted on the offset unit 50 at first right angle corner 80 of the Z-shaped body 52. First adjustment knob 120 is connected to the first mirror 100 and the first mirror 100 is movably mounted on the Z-shaped body 52 to be moved by the first mirror adjustment knob 120 as necessary to focus an image from the objective mirror onto the user's eye via ocular lens 89. A second mirror adjustment knob 122 is mounted on the offset unit 50 at second right angle corner 82 of the Z-shaped body 52. Second adjustment knob 122 is connected to second mirror 102. The second mirror 102 is movably mounted on the Z-shaped body 52 to be moved by the second mirror adjustment knob 122 to further focus the image on the user's eye. The mirrors 100, 102 can be mounted via screw-type mountings or the like whereby movement of the adjustment knobs 120, 122 will move the mirrors 100, 102 as required during a focusing operation as will be understood by those skilled in the art based on the teaching of this disclosure.

It is noted that FIG. 1 is a plan view of the combination 10 of the present invention. FIG. 1 can be considered as being either a top plan view or a bottom plan view depending on whether the offset unit 50 is re-directing light from left to right or from right to left. Thus, the combination 10 of the present invention can be used for re-directing light from a left eye to a right eye, or from a right eye to a left eye.

It is understood that while certain forms of the present invention have been illustrated and described herein, it is not to be limited to the specific forms or arrangements of parts described and shown.

What is desired to be covered by Letters Patent is:

1. In combination:
    a) a sighting scope for a firearm comprising
        (1) a tubular body having an objective end, an eyepiece end which is spaced apart from the objective end, and a longitudinal axis extending between the objective end and the eyepiece end,
        (2) an objective lens unit on the objective end of the tubular body and which includes an objective lens and a plane containing the objective lens,
        (3) an eyepiece lens unit on the eyepiece end of the tubular body and which includes an ocular lens and a plane containing the ocular lens of the eyepiece lens unit, the plane containing the ocular lens being oriented parallel to the plane containing the objective lens,
        (4) a first scope ring on the tubular body,
        (5) a second scope ring on the tubular body,
        (6) a focusing ring on the tubular body and which is associated with the ocular lens of the eyepiece lens unit,
        (7) a windage and elevation adjustment knob unit on the tubular body,
        (8) a tubular cover on the eyepiece unit surrounding the ocular lens and extending outwardly from the ocular lens away from the objective end of the tubular body,
        (9) a scope light path through said sighting scope which extends from the objective end of the tubular body to the eyepiece end of the tubular body in the direction of the longitudinal axis of the tubular body; and
    b) an offset unit which includes
        (1) a Z-shaped body having
            (A) a main leg having a first end and a second end and a longitudinal axis extending between the first end of the main leg and the second end of the main leg,
            (B) a first leg having a first end and a second end, with the second end of the first leg being connected to the first end of the main leg and a longitudinal axis extending between the first end of the first leg and the second end of the first leg,
            (C) a second leg having a first end and a second end, with the first end of the second leg being connected to the second end of the main leg and a longitudinal axis extending between the first end of the second leg and the second end of the second leg,
            (D) a first right angle corner between the second end of the first leg and the first end of the main leg,
            (E) a second right angle corner between the second end of the main leg and the first end of the second leg,
            (F) an eyepiece connection on the first end of the first leg, the eyepiece connection having a connecting element which releasably connects the first end of the first leg to the tubular cover on the eyepiece unit of said sighting scope,
            (G) an ocular lens on the second end of the second leg,
            (H) a plane containing the eyepiece connection of the Z-shaped body, and
            (I) a plane containing the ocular lens of the Z-shaped body of said offset unit and which is oriented parallel to the plane containing the eyepiece connection of the Z-shaped body and which is spaced apart from the eyepiece connection of the Z-shaped body,
        (2) a first mirror located at the first corner of the Z-shaped body and which is oriented at a 45° and with respect to the plane containing the ocular lens of the eyepiece lens unit of said sighting scope and which is positioned on the longitudinal axis of the first leg and the longitudinal axis of the main leg and on the scope light path,
        (3) a second mirror located at the second corner of the Z-shaped body and which is oriented parallel to the first mirror and is positioned on the longitudinal axis of the main leg of the Z-shaped body and on the longitudinal axis of the second leg of the Z-shaped body,
        (4) a light path through said offset unit which includes
            (A) a first portion extending from the ocular lens of the eyepiece lens unit of said sighting scope to the first mirror along the scope light path of said sighting scope,
            (B) a second portion oriented at a right angle to the first portion and which extends from the first mirror to the second mirror in the direction of the longitudinal axis of the main leg of the Z-shaped body, and
            (C) a third portion oriented at a right angle to the second portion of the light path through said offset unit and parallel to the first portion of the light path through said offset unit and which extends from the second mirror in the direction of the longitudinal axis of the second leg of the Z-shaped body from the second mirror to the ocular lens of said offset unit, and
        (5) a first mirror adjustment knob mounted on said offset unit at the first right angle corner of the Z-shaped body and connected to the first mirror, the first mirror being movably mounted on the Z-shaped body to be moved by the first mirror adjustment knob, and
        (6) a second mirror adjustment knob mounted on said offset unit at the second right angle corner of the Z-shaped body and connected to the second mirror, the second mirror being movably mounted on the Z-shaped body to be moved by the second mirror adjustment knob.

* * * * *